United States Patent Office 3,081,350
Patented Mar. 12, 1963

3,081,350
SELECTED FLUOROALKYL THIOPEROXIDES AND THEIR PREPARATION
Sam Andreades, Wilmington, Del., assignor to E. I. du Pont de Nemours and Company, Wilmington, Del., a corporation of Delaware
No Drawing. Filed May 24, 1961, Ser. No. 112,176
18 Claims. (Cl. 260—607)

This invention relates to, and has as its principal objects provision of, certain novel organic compounds containing both sulfur and fluorine, namely, fluoroalkyl thioperoxides, and methods for the preparation of the same.

This invention provides novel fluoroalkyl thioperoxides of the formula $(R_f\text{—}S\text{—}O\text{—})_nR$, wherein $R_f$ is perfluoroalkyl or ω-hydroperfluoroalkyl of up to 18 carbon atoms, $n$ is 1 or 2, and R is an alkyl radical of up to 30 carbon atoms or a divalent saturated aliphatic hydrocarbon radical, i.e., an alkylene radical, of 2 to 12 carbon atoms. These fluoroalkyl thioperoxides are obtained by reacting a perfluoroalkyl sulfenyl halide or an ω-hydroperfluoroalkyl sulfenyl halide with a monohydric alkanol or an alkanediol in the presence of an acid acceptor, e.g., pyridine.

The process of the invention can be schematically represented by the following equations.

(1) When $n$ is 1:

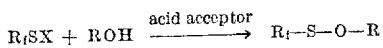

and (2) When $n$ is 2:

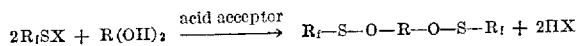

wherein $R_f$ and R have the previously indicated meanings and X is halogen of atomic number 17 through 53.

The process of these equations may be accomplished quite simply by contacting the reactants in the presence of an acid acceptor and, optionally, in an inert reaction medium at moderate temperatures and pressures. In the reaction, any monohydric alkanol or alkanediol is suitable. For practical reasons, the monohydric alkanols employed are those which contain up to 30 carbon atoms, i.e., R has 30 carbons, and the alkanediols those which contain up to 12 carbons, i.e., R has 12 carbons. Examples of suitable monohydric alkanols are methanol, ethanol, isopropanol, butanol, 2-methylpropanol-1, octanol-1,3-ethylhexanol-1, dodecanol-1, 2-propyl-4-ethylhexanol-1, octadecanol-1, pentanol-2, octacosanol-1, and decacosanol-1. Examples of suitable alkanediols are ethane-1,2-diol, butane-1,4-diol, hexane-1,6-diol, decane-1,10-diol, dodecane-1,12-diol, heptane-1,4-diol, nonane-1,6-diol, and the like.

In like manner, any perfluoroalkyl or ω-hydroperfluoroalkyl sulfenyl halide containing up to 18 carbon atoms in the fluoroalkyl group can be used in the process. Examples of useful compounds are perfluoromethyl sulfenyl chloride, perfluoro-2-propyl sulfenyl chloride, trifluoromethyl sulfenyl bromide, perfluoro-1-butyl sulfenyl chloride, 5H-decafluoro-1-pentyl sulfenyl bromide, perfluoro-1-heptyl sulfenyl chloride, perfluoro-1-hexadecyl sulfenyl chloride, perfluoro-1-octadecyl sulfenyl chloride, and the like. The above perfluoroalkyl and ω-hydroperfluoroalkyl sulfenyl halides are made by known methods. Thus, perfluoroalkyl and ω-hydroperfluoroalkyl sulfenyl chlorides are readily prepared by reacting chlorine with the corresponding disulfides.

The reaction of the perfluoroalkyl or ω-hydroperfluoroalkyl sulfenyl halide with a monohydric alkanol theoretically involves one mole of each reactant, while the alkanediol involves two moles of the sulfenyl halide per mole of the alcohol. In practice, the alcohol, if its boiling point is sufficiently different from that of the products, is used in excess so that it functions both as a reactant and as a reaction medium. The excess employed is not critical and it can be from two to ten times more than the theoretically required amount.

As noted above, an acid acceptor is also requisite to the process. Pyridine is the preferred acid acceptor but, in general, compounds having $pK_a$ values in the range 8–10 are usable. Compounds with higher basicities tend to decompose the desired fluoroalkyl thioperoxide. Alkali metal fluorides such as sodium fluoride which react with liberated hydrohalic acid to form molecular compounds can be used. In addition to pyridine, amines such as quinoline, pyrrolidine, N-alkylpyrrolidines, particularly N-methylpyrrolidine, and the like are also useful.

The amount of acid acceptor used is at least that required to react with all of the hydrohalic acid liberated. In the case of the monohydric alkanols, one mole of hydrohalic acid is produced and the amount of pyridine theoretically required is therefore one mole. In the case of the alkanediols, two moles of hydrohalic acid are liberated and two moles of pyridine are therefore theoretically required.

Temperatures usable in the process can be as low as −100° C. or as high as +100° C. In general, however, the best results are obtained at temperatures in the range of −20° C. to +10° C. Pressure is not a critical variable and may be atmospheric or in excess of atmospheric. Because excellent results are secured at atmospheric pressure, ambient pressure is generally used.

If desired, a normally liquid organic compound inert to the reactants and reaction product can be included in the charge to function as a reaction medium. The amount of such medium included is not critical and it can equal or exceed the weight of the monohydric alkanol or alkanediol by many fold. Suitable such media are chloroform, dichloromethane, carbon tetrachloride, excess pyridine, hexane, pentane, and the like. In general, it is desirable to use a reaction medium in which the acid acceptor-hydrohalide complex is soluble.

As illustrated in Example V, the products of this invention are solvents for tetrafluoroethylene polymers and the resulting solutions are useful for imparting water-repellency to cellulosic fabrics. The are also useful as polymerization initiators, as cross-linking components in polymers, and in biological applications.

There follow some examples intended to illustrate but not to limit the invention. In these examples, pyridine has been used as the acid acceptor, but solely for reasons of convenience. In place thereof and as a full equivalent thereo can be used other basic compounds which have $pK_a$ values of 8 to 10. All pressures are ambient atmospheric.

*Example I*

A solution of 92.0 g. (2 moles) of ethanol and 32.0 g. (0.4 mole) of pyridine is charged into a reactor protected from the atmosphere with a tube containing anhydrous calcium chloride and having a gas inlet dispersion tube. The solution is cooled to 0° C. and stirred rapidly, while 53.0 g. (0.539 mole) of trifluoromethylsulfenyl chloride is added over a period of approximately one hour. The reaction which takes place is exothermic and the rate of addition of the trifluoromethylsulfenyl chloride is controlled so as to maintain the temperature of the reaction mixture below ca. 10° C. At the end of the addition, the flask is fitted for distillation and 55.0 g. (97%) of colorless product, B.P. 47–52° C., is collected. This material is redistilled to give 46.0 g. (81%), B.P. 47–49° C., of S-trifluoromethyl ethyl thioperoxide. Since the infrared spectrum of this product shows small amounts of alcohol impurity, further purification is effected by extraction of the product with several portions of cold water, drying over anhydrous sodium sulfate and redistilling the dried organic layer.

*Analysis.*—Calcd. for $C_3H_5OF_3S$: C, 24.66; H, 3.45; F, 39.01; S, 21.94; ethoxyl, 30.8. Found: C, 24.61; H, 3.58; F, 39.32; S, 21.60; ethoxyl, 29.93.

The $F^{19}$ n-m-r spectrum is completely consistent with the proposed structure. A single peak at $-491$ c.p.s. ("Freon 112" at 0 c.p.s.; "Freon 112" is a Du Pont trademark for 1,2-difluoro-1,1,2,2-tetrachloroethane) at 40 mc./s. was displayed representing the trifluoromethyl fluorines. The proton n-m-r spectrum shows a quadruplet at $-219$ c.p.s. ($CH_2$) and a triplet at $-53$ c.p.s. ($CH_3$) at 60 mc./s. measured from tetramethylsilane as an external standard. The coupling constant is 7 c.p.s. The ultraviolet spectrum of the product displayed $\lambda_{max}$ 262 m$\mu$ ($\epsilon=37$) with end absorption at 225 m$\mu$. The sample appears to be slightly soluble in water and a negative test for fluoride ion is obtained after the sample is in contact with boiling water for 10 minutes indicating the thioperoxide is hydrolytically stable.

In another preparation of S-trifluoromethyl ethyl thioperoxide, 136.0 g. (1.0 mole) of trifluoromethylsulfenyl chloride is added to 46.0 g. (1 mole) of ethanol in 150 ml. of pyridine at 0° C. The mixture is filtered while cold to remove the pyridine hydrochloride precipitate and the filtrate is distilled to give 90.0 g. (62%) of product, B.P. 43–48° C., the bulk of which boils at 48° C. Darkening of the pot residue slowly occurs during the distillation.

*Example II*

A reaction vessel, equipped as in Example I, but including a trap attached to the top of the condenser and cooled in a solid carbon dioxide-acetone bath in turn protected from atmospheric moisture by a tube containing anhydrous calcium chloride is charged with 50.0 g. (1.56 mole) of methanol in 16.0 g. (0.2 mole) of pyridine. Trifluoromethylsulfenyl chloride (27.0 g., 0.2 mole) is added at a rate such that the reaction temperature remains below approximately 10° C. After stirring at room temperature overnight, the water condenser (leading to a trap cooled in solid carbon dioxide) is replaced with an air condenser and the mixture is warmed. Refluxing at ca. 30° C. occurs and 23.0 g. (89%) of colorless product is collected in the trap, at which time the refluxing temperature rises to ca. 63° C. (methanol). The product in the trap is redistilled to give 21.0 g. (84%) of material, B.P. 25–26° C. The infrared spectrum of this material is consistent with that of S-trifluoromethyl methyl thioperoxide.

*Example III*

Using the procedure of Example II, 18.0 g. (0.3 mole) of isopropyl alcohol, 24.0 g. (0.3 mole) of pyridine in 100 ml. of methylene chloride is reacted with 42.0 g. (0.3 mole) of trifluoromethylsulfenyl chloride.

The pyridine hydrochloride is removed by filtration and distillation gives 22.2 g., B.P. 45–70° C., and 3.0 g., B.P. 71–73° C. The infrared spectrum shows this product to be contaminated with methylene chloride. The preparation is repeated using excess pyridine as a solvent and eliminating the use of methylene chloride. In this manner, pure S-trifluoromethyl isopropyl thioperoxide, B.P. 68–70° C., is obtained uncontaminated by alcohol.

*Example IV*

In the manner described in Example II, 57.5 g. (0.42 mole) of trifluoromethylsulfenyl chloride is reacted with 12.4 g. (0.2 mole) of ethylene glycol and 32.0 g. (0.4 mole) of pyridine in 150 ml. of methylene chloride at 0° C. Distillation gives 26.2 g., B.P. 50–55° C. (30 mm.), of colorless liquid. Redistillation of the product gives fraction 1, B.P. 45–51° C. (48 ml., 5.0 g.); and fraction 2, 51–64° C. (48 ml., 13.0 g.). These materials are purified by gas-phase chromatography on a 2-meter column packed with 20% by weight of a diglyceride of ω-trifluorohexanoic acid on a commercial 40–60 mesh diatomaceous earth absorbent. The column temperature is 125° C., and the helium flow rate is 70 cc./min. The peak eluting at 4.3 minutes (29 area percent of fraction 1 and 83 area percent of fraction 2) is separated and is 1,2-bis(S-trifluoromethylthioperoxy)ethane.

*Analysis.*—Calcd. for $C_4H_4O_2F_6S_2$. C, 18.33; H, 1.54; S, 24.46; F, 43.48. Found: C, 19.92; H, 1.84; S, 23.56; F, 42.36.

*Example V*

Using the procedure described in Example IV, 136.0 g. of trifluoromethylsulfenyl chloride is reacted with 100.0 g. of 2,2,2-trifluoroethanol in 150 ml. of pyridine at 0° C. After removal of the pyridine hydrochloride by filtration, distillation of the filtrate gives the following fractions: (1) B.P. 34–44° C., 16.0 g. (yellow); (2) B.P. 44–47° C., 10.0 g. (pale yellow); (3) 47–49° C., 42.0 g.; (4) B.P. 49–50° C., 67.0 g.; (5) 50–60° C., 6.0 g. Fractions 3 to 5 are colorless. Fractions 2–4 amount to 119 g. (60%).

*Analysis.*—Calcd. for $C_3H_2OSF_5$: C, 18.01; H, 1.01; F, 56.97; S, 16.02. Found: C, 18.23; H, 1.12; F, 56.82; S, 16.51.

The $F^{19}$ n-m-r spectrum using "Freon 112" as an external standard at 40 mc./s. shows a singlet ($CF_3S$) at $-443$ c.p.s. and a triplet ($CF_3CH_2$) at $+420$ c.p.s. The proton n-m-r spectrum displayed a quadruplet ($CH_2$) at $-231$ c.p.s. at 60 mc./s. (tetramethylsilane at 0 c.p.s.). The coupling constant is 8 c.p.s. These data along with the infrared spectrum are in complete accord the structure of S-trifluoromethyl-2,2,2-trifluoroethyl thioperoxide.

The product of this example is a solvent for polytetrafluoroethylene at room temperature. The resultant solutions of the polytetrafluoroethylene are useful in imparting water-repellency to cellulosic sheet materials. Thus, filter paper impregnated with these solutions is rendered water-repellent after drying.

*Example VI*

Heptafluoroisopropyl sulfenyl chloride is prepared from heptafluoroisopropyl iodide using the reactions of the following equations:

$$(CF_3)_2CFI + S \rightarrow (CF_3)_2CFSSCF(CF_3)_2 + I_2$$

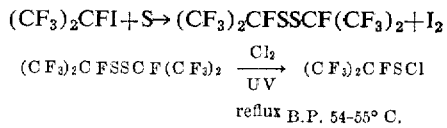

The $(CF_3)_2CFI$ of the above reaction is obtained by reacting hexafluoropropylene with potassium fluoride and iodine in accord with the following equation:

$$CF_3CF=CF_2 + KF + I_2 \rightarrow (CF_3)_2CFI$$

While the solution is stirred rapidly, 7.5 g. (0.032 mole) of heptafluoro-2-propyl sulfenyl chloride, prepared as above, is added dropwise to 4.0 g. (0.125 mole) of methanol and 2.5 g. (0.023 mole) of pyridine at 0° C. The product is extracted with several portions of water, dried over anhydrous sodium sulfate, and distilled to give 5.5 g. of the S-heptafluoroisopropyl methyl thioperoxide, B.P. 69–70° C. (75%). The infrared spectrum is in complete accord with this structure. The ultarviolet spectrum displayed $\lambda_{max}$ 252 mu ($\epsilon=65$).

*Analysis.*—Calcd. for $C_4H_3F_7OS$: C, 20.70; H, 1.30; F, 57.30; S, 13.81. Found: C, 20.92; H, 1.50; F, 56.97; S, 13.68.

Since obvious modifications and equivalents in the invention will be evident to those skilled in the chemical arts, I propose to be bound solely by the appended claims.

The embodiments of the invention in which an exclusive property or privilege is claimed are defined as follows:

1. Fluoroalkyl thioperoxides of the formula

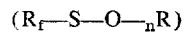

wherein $R_f$ is selected from the group consisting of perfluoroalkyl and ω-hydroperfluoroalkyl radicals of up to 18 carbon atoms, $n$ is an integer from 1 to 2, inclusive, and R is alkyl of up ot 30 carbons when $n$ is 1 and alkylene of 2 to 12 carbons atoms when $n$ is 2.

2. S-trifluoromethyl ethyl thioperoxide.
3. S-trifluoromethyl methyl thioperoxide.
4. S-trifluoromethyl isopropyl thioperoxide.
5. 1,2-bis(S-trifluoromethylthioperoxy)ethane.
6. S-trifluoromethyl-2,2,2-trifluoroethyl thioperoxide.
7. S-heptafluoroisopropyl methyl thioperoxide.
8. The process which comprises reacting a member of the group consisting of perfluoroalkyl sulfenyl halides and ω-hydroperfluoroalkyl sulfenyl halides of up to 18 carbon atoms with a member of the group consisting of alkanols of up to 30 carbon atoms and alkanediols of from 2 to 12 carbon atoms in the presence of a sufficient amount of an acid acceptor to react with all the hydrohalic acid produced, said acid acceptor being a basic compound having a $pK_a$ value in the range of 8–10.
9. The process of claim 8 wherein the acid acceptor is pyridine.
10. The process of claim 8 wherein the temperature is between −100 and +100° C.
11. The process of claim 8 wherein the temperature is between −20 and +10° C.
12. The process of claim 8 accomplished in an inert organic reaction medium.
13. The process which comprises reacting ethanol with trifluoromethylsulfenyl chloride in the presence of an acid acceptor to react with all the hydrohalic acid produced, said acid acceptor being a basic compound having a $pK_a$ value in the range of 8–10.
14. The process which comprises reacting methanol with trifluoromethylsulfenyl chloride in the presence of an acid acceptor to react with all the hydrohalic acid produced, said acid acceptor being a basic compound having a $pK_a$ value in the range of 8–10.
15. The process which comprises reacting isopropanol with trifluoromethylsulfenyl chloride in the presence of an acid acceptor to react with all the hydrohalic acid produced, said acid acceptor being a basic compound having a $pK_a$ value in the range of 8–10.
16. The process which comprises reacting ethylene glycol with trifluoromethylsulfenyl chloride in the presence of a sufficient amount of an acid acceptor to react with all the hydrohalic acid produced, said acid acceptor being a basic compound having a $pK_a$ value in the range of 8–10.
17. The process which comprises reacting 2,2,2-trifluoroethanol with trifluoromethylsulfenyl chloride in the presence of a sufficient amount of an acid acceptor to react with all the hydrohalic acid produced, said acid acceptor being a basic compound having a $pK_a$ value in the range of 8–10.
18. The process which comprises reacting methanol with heptafluoro-2-propyl sulfenyl chloride in the presence of a sufficient amount of an acid acceptor to react with all the hydrohalic acid produced, said acid acceptor being a basic compound having a $pK_a$ value in the range of 8–10.

No references cited.

UNITED STATES PATENT OFFICE
CERTIFICATE OF CORRECTION

Patent No. 3,081,350 March 12, 1963

Sam Andreades

It is hereby certified that error appears in the above numbered patent requiring correction and that the said Letters Patent should read as corrected below.

Column 5, line 4, for "ot" read -- to --; column 5, line 30, and column 6, lines 4 and 9, after "of", each occurrence, insert -- a sufficient amount of --.

Signed and sealed this 5th day of November 1963.

(SEAL)
Attest:
ERNEST W. SWIDER
Attesting Officer

EDWIN L. REYNOLDS
Acting Commissioner of Patents